United States Patent [19]
Huang

[11] Patent Number: 5,549,311
[45] Date of Patent: Aug. 27, 1996

[54] ARMREST AND HANDLE ASSEMBLY FOR A STROLLER

[76] Inventor: Li-chu C. Huang, No. 9, Alley 2, Lane 606, Sec. 2, Po Ai Rd., Chia Yi City, Taiwan

[21] Appl. No.: 520,835

[22] Filed: Aug. 29, 1995

[51] Int. Cl.$^6$ ..................................................... B62B 9/20
[52] U.S. Cl. ..................................... 280/47.36; 280/47.38
[58] Field of Search .......................... 280/47.36, 47.371, 280/47.38, 642, 644, 655.1, 658, 47.4

[56] References Cited

U.S. PATENT DOCUMENTS

| | | | |
|---|---|---|---|
| 4,412,688 | 11/1983 | Giordani | 280/658 X |
| 4,632,421 | 12/1986 | Shamie | 280/47.36 X |
| 4,660,850 | 4/1987 | Nakao et al. | 280/47.36 X |
| 4,779,879 | 10/1988 | Kassai | 280/47.36 |
| 4,887,834 | 12/1989 | Cabagnero | 280/47.36 X |
| 4,906,017 | 3/1990 | Kassai | 280/47.36 X |
| 5,004,253 | 4/1991 | Nakao et al. | 280/47.38 |
| 5,029,886 | 7/1991 | Takahashi et al. | 280/47.36 X |
| 5,056,805 | 10/1991 | Wang | 280/47.36 |

FOREIGN PATENT DOCUMENTS 0297372  11/1989  Japan ..................................... 280/642

*Primary Examiner*—Brian L. Johnson
*Attorney, Agent, or Firm*—Sixbey, Friedman, Leedom & Ferguson, P.C.; Stuart J. Friedman

[57] ABSTRACT

An armrest and handle assembly for a stroller which includes a pair of first stands and a pair of second stands pivotally engaged with each other. The armrest and handle assembly includes a pair of positioning bases each fixedly mounted on one of the pair of first stands and each having a first retaining rod formed thereon. A substantially U-shaped armrest module includes two armrests each having a first end portion pivotally engaged with one of the pair of positioning bases and each having a second end portion with a second retaining rod formed thereon. A substantially U-shaped handle module includes two handles each having a lower end pivotally engaged with one of the pair of positioning bases. A pair of switch devices are each mounted on a corresponding one of the two handles and each includes a catch member detachably engaged with one of the two first retaining rods and detachably engaged with one of the two second retaining rods.

1 Claim, 10 Drawing Sheets

5,549,311

ARMREST AND HANDLE ASSEMBLY FOR A STROLLER

BACKGROUND OF THE INVENTION

1. Field of Invention

The present invention relates to a stroller, and more particularly to an armrest/handle assembly for a stroller.

2. Related Prior Art

A conventional stroller is shown in FIG. 10. However, by such an arrangement, there still remain shortcomings in the conventional stroller.

There will be a complete illustration in the detailed description of the preferred embodiments, concerning the conventional stroller.

The present invention has arisen to mitigate and/or obviate disadvantages of the conventional stroller.

SUMMARY OF THE INVENTION

The primary objective of the present invention is to provide an armrest/handle assembly with a free orientation function.

In accordance with one aspect of the present invention, there is provided an armrest and handle assembly for a stroller which comprises a pair of first stands and a pair of second stands which are pivotally engaged with each other, a substantially U-shaped seat support member pivotally mounted between the first and second stands and including two support braces each having a first end pivotally engaged with a mediate portion of a corresponding one of the pair of first stands and a second end pivotally engaged with a mediate portion of a corresponding one of the pair of second stands.

The armrest and handle assembly comprises a pair of positioning bases each fixedly mounted on an upper portion of a corresponding one of the pair of first stands. Two first retaining rods are each formed on a corresponding one of the pair of positioning bases.

A substantially U-shaped armrest module includes two armrests each having a first end portion pivotally engaged with a corresponding one of the pair of positioning bases. Two second retaining rods are each formed on a second end portion of a corresponding one of the two armrests.

A substantially U-shaped handle module includes two handles each having a lower end pivotally engaged with a corresponding one of the pair of positioning bases. A pair of switch devices are each mounted on a corresponding one of the two handles and each includes a catch member detachably engaged with a corresponding one of the two first retaining rods.

Each of the two catch members is slidable on the associated handle between a first position where the catch member is stopped by the associated first retaining rod such that each of the two handles is secured to a corresponding one of the two positioning bases, and a second position where the catch member is detached from the associated first retaining rod such that each of the two handles is released from and pivoted relative to the associated positioning base.

Each of the catch members is also detachably engaged with a corresponding one of the two second retaining rods and is slidable on the associated handle between a third position where the catch member is stopped by the associated second retaining rod such that each of the two handles is secured to a corresponding one of the two armrests, and a fourth position where the catch member is detached from the associated second retaining rod such that each of the two handles is released from the associated armrest and is pivoted relative to the associated positioning base.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 10:
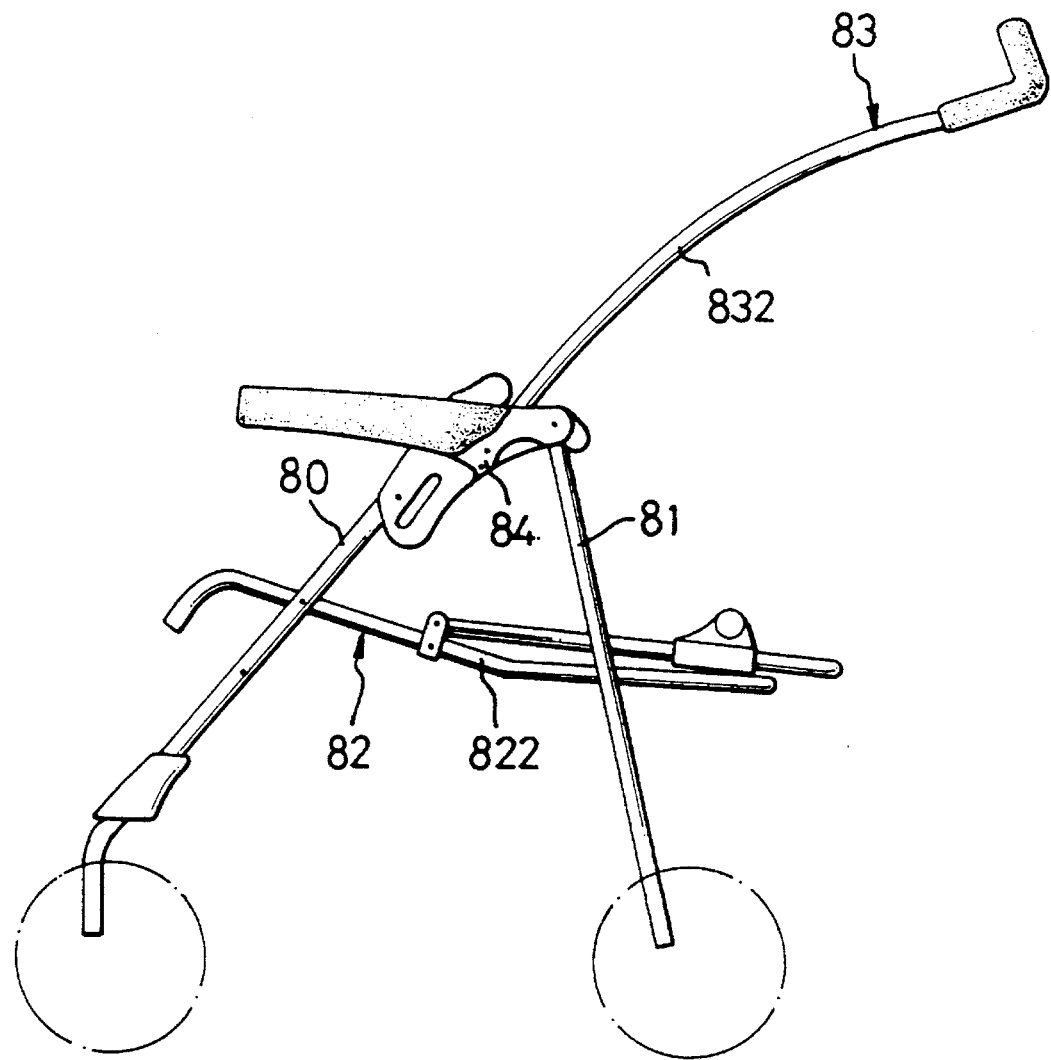
FIG. 10 is a front plan view of a conventional stroller in accordance with the prior art.

For a better understanding of features and benefits of the present invention, reference is made to FIG. 10, illustrating a conventional stroller in accordance with the prior art. A conventional stroller comprises a pair of front stands 80 and a pair of rear stands 81 pivotally engaged with each other.

A substantially U-shaped seat support member 82 is pivotally mounted between the front and rear stands 80 and 81 and includes two support braces 822 each having a first end pivotally engaged with a mediate portion of a corresponding one of the pair of front stands 80 and a second end pivotally engaged with a mediate portion of a corresponding one of the pair of rear stands 81.

There are two positioning bases 84 each fixedly mounted on an upper end of a corresponding one of the pair of front stands 80 and each pivotally engaged with an upper end of a corresponding one of the pair of rear stands 81. A substantially U-shaped handle module 83 includes two handles 832 each having a lower end fixedly attached to a corresponding one of the pair of positioning bases 84.

By such an arrangement, the handle module 83 is fixedly fitted on the positioning bases 84 and is disposed above the rear stands 81 without being able to pivot forwardly to be positioned and located above the front stands 80, so greatly limiting facility of the handle module 83 and easily causing an inconvenience to a user when in use.

Figure 1:
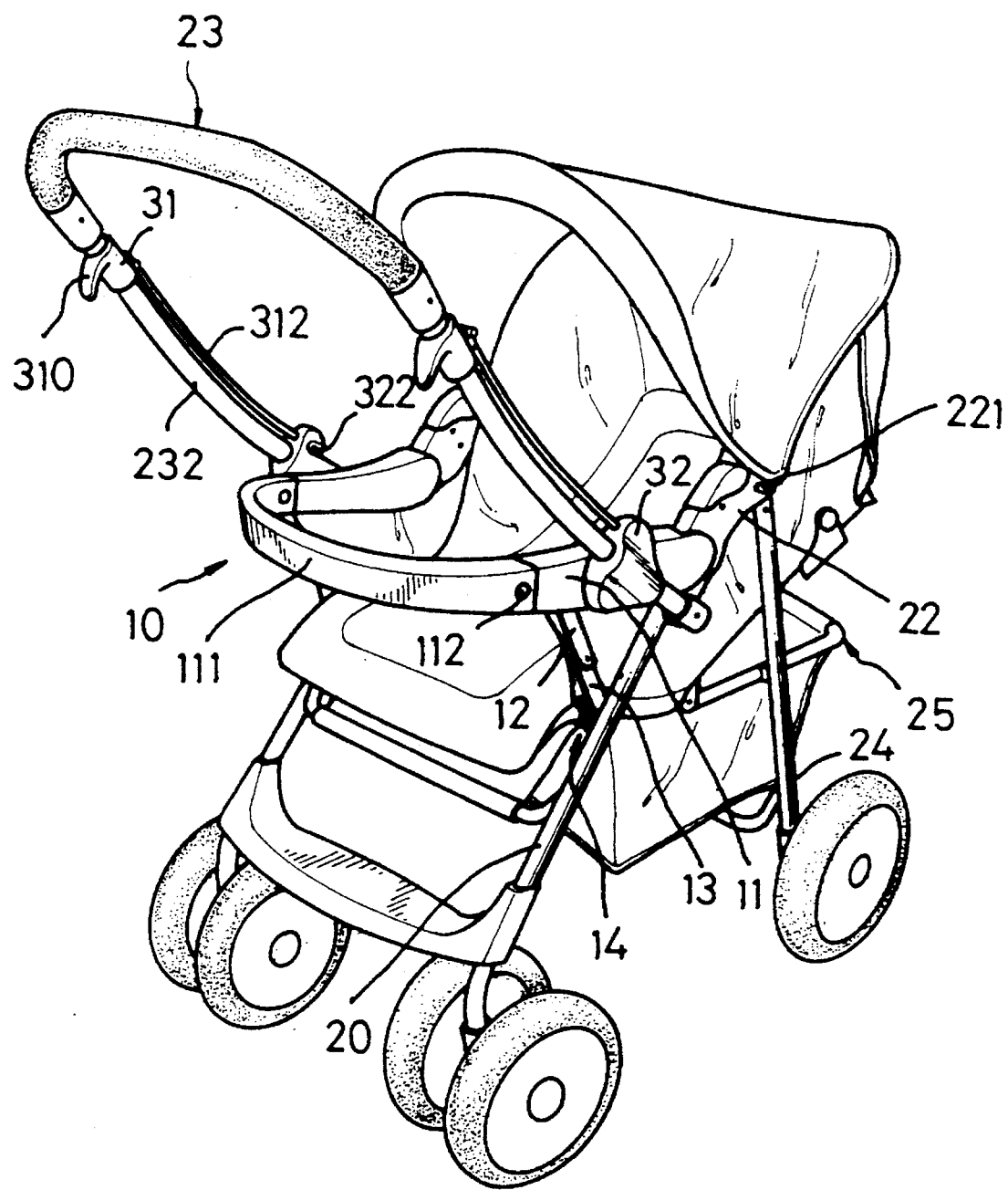
FIG. 1 is a perspective view of a stroller in accordance with the present invention.
Figure 2:
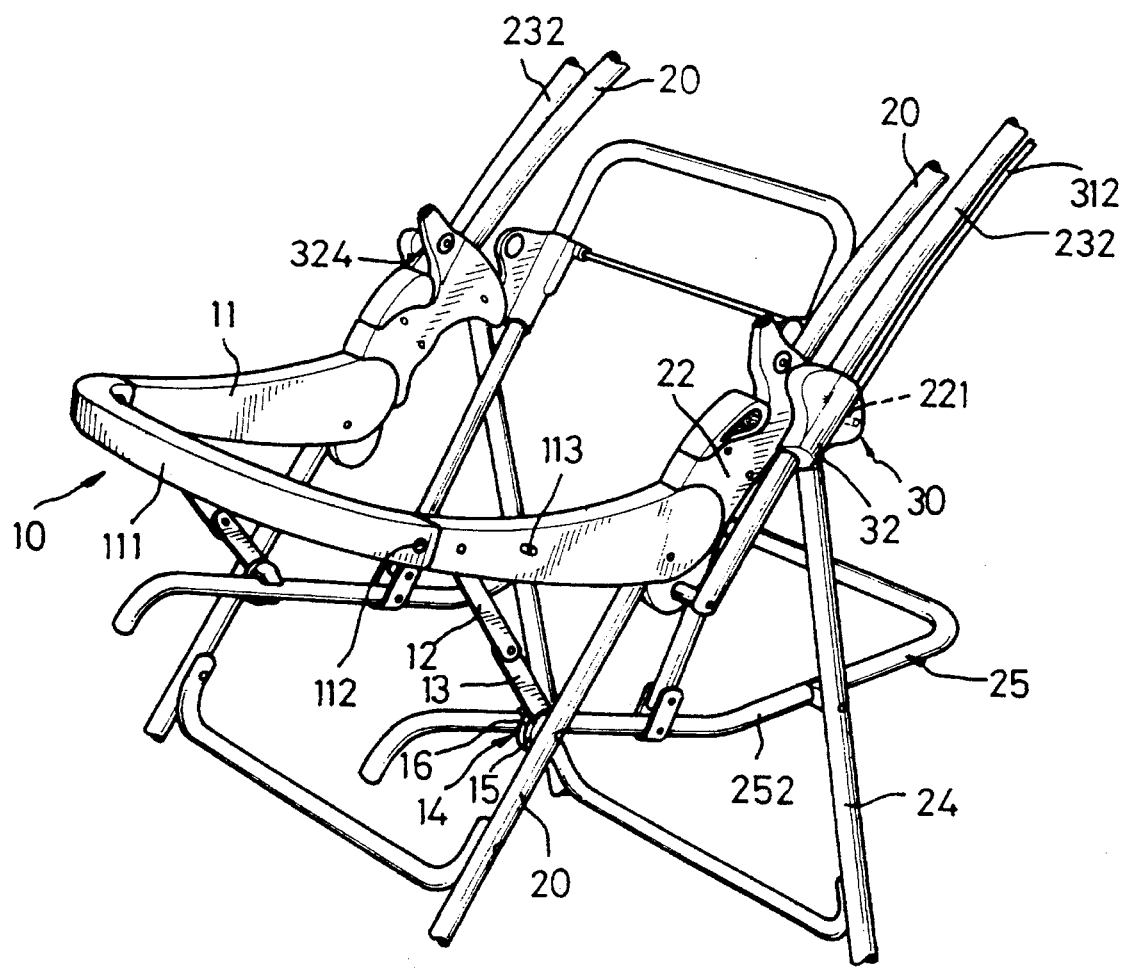
FIG. 2 is a partially perspective view of FIG. 1.

Referring to FIGS. 1–9, and initially to FIGS. 1 and 2, an armrest and handle assembly in accordance with the present invention is provided for a stroller which comprises a pair of first stands 20 and a pair of second stands 24 pivotally engaged with each other. A substantially U-shaped seat support member 25 is pivotally mounted between the first and second stands 20 and 24 and includes two support braces 252 each having a first end pivotally engaged with a mediate portion of a corresponding one of the pair of first stands 20 and a second end pivotally engaged with a mediate portion of a corresponding one of the pair of second stands 24.

The armrest and handle assembly comprises a pair of positioning bases 22 each fixedly mounted on an upper portion of a corresponding one of the pair of first stands 20. There are two first retaining rods 221 each formed on a corresponding one of the pair of positioning bases 22. A substantially U-shaped armrest module 10 includes two armrests 11 each having a first end portion pivotally engaged with a corresponding one of the pair of positioning bases 22 and each having a second end portion with a second retaining rod 113 formed thereon.

A substantially U-shaped handle module 23 includes two handles 232 each having a lower end pivotally engaged with a corresponding one of the pair of positioning bases 22. A pair of switch devices 30 are each mounted on a corresponding one of the two handles 232 for operating movement of the associated handle 232.

Figure 3:
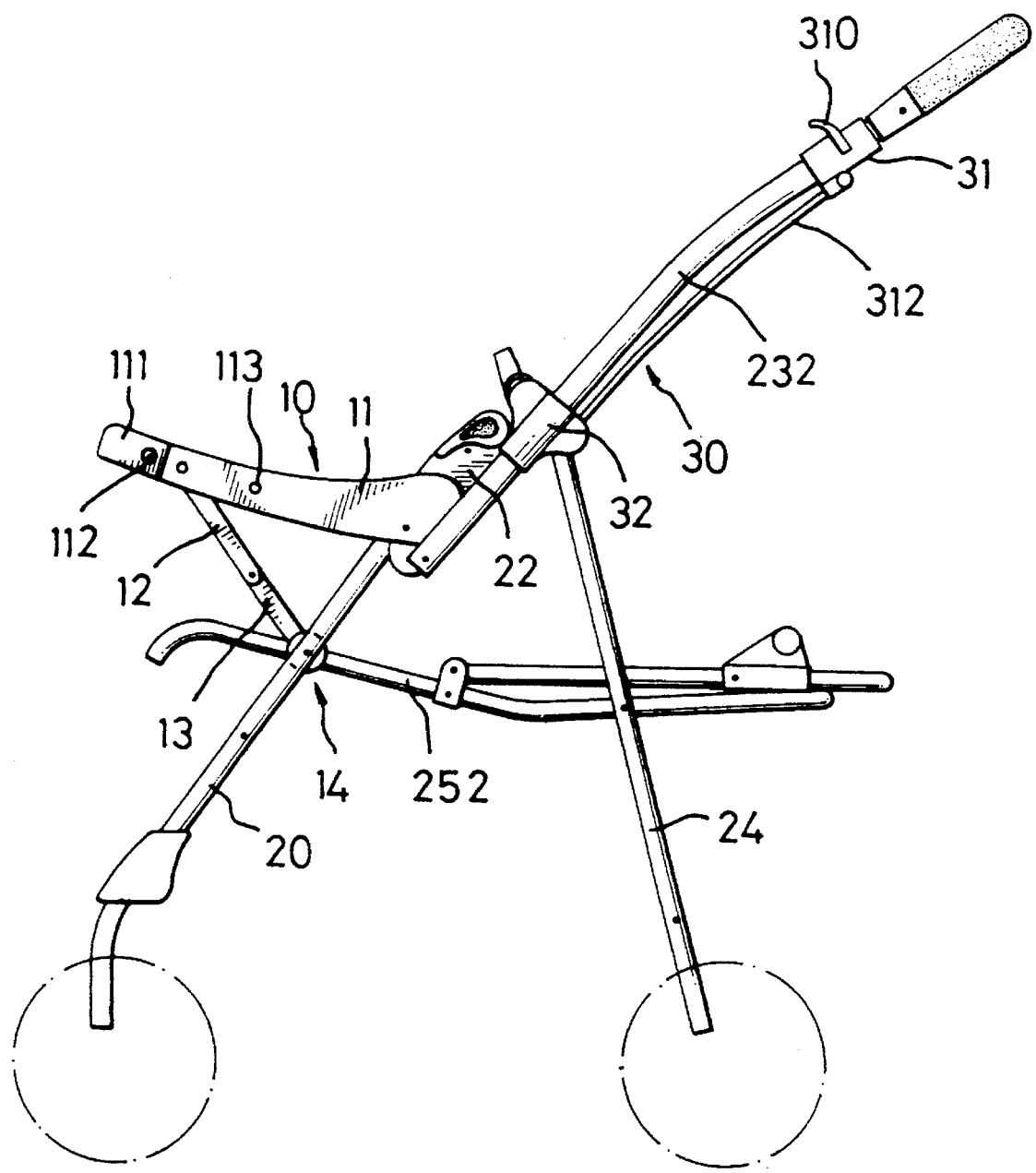
FIG. 3 is a side plan view of the stroller.
Figure 4:
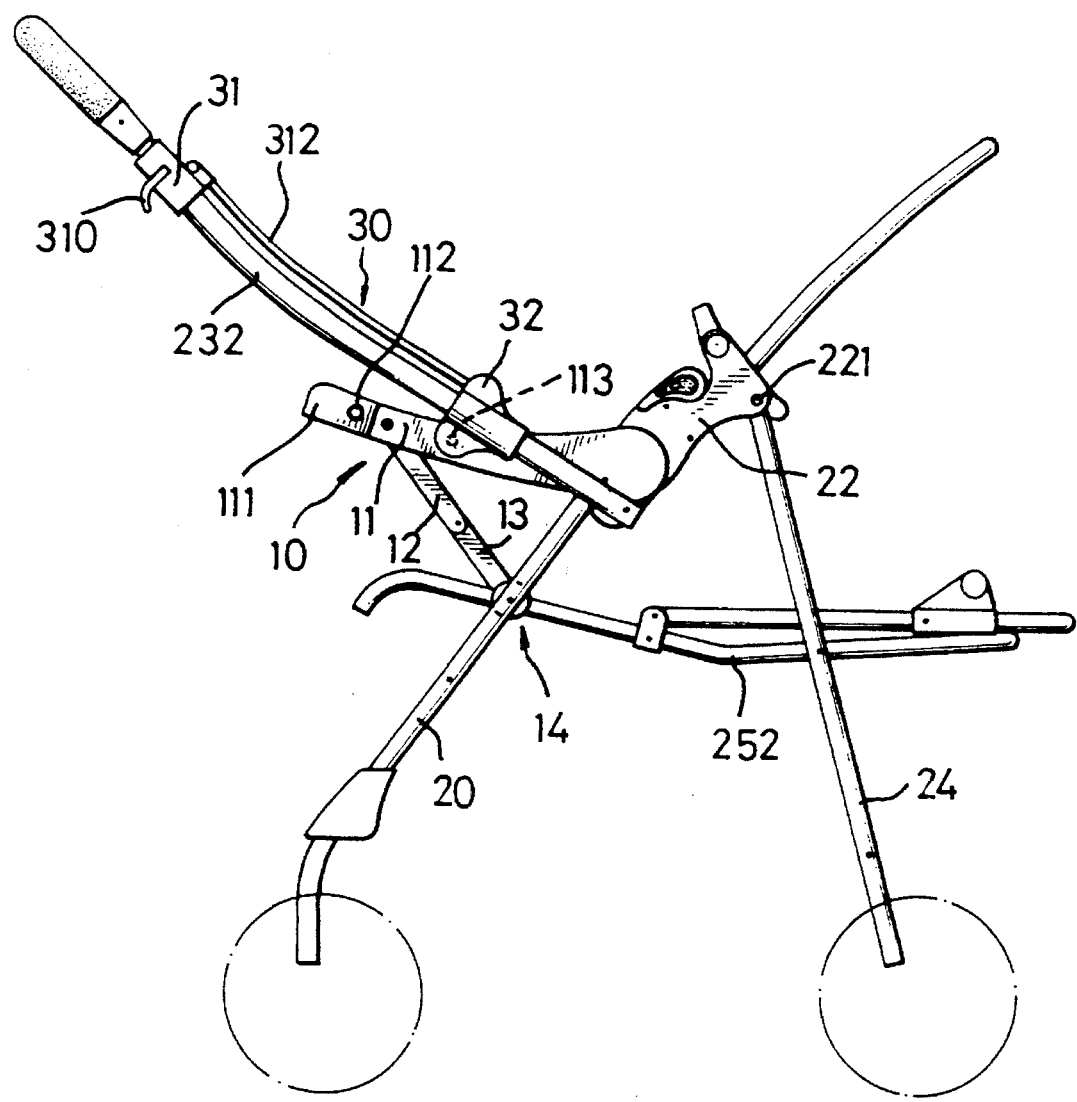
FIG. 4 is an operational view of FIG. 3.

Referring to FIGS. 3 and 4 with reference to FIGS. 1 and 2, each of the pair of switch devices 30 includes a catch member 32 slidably mounted on the associated handle 232, a first groove 322 (see FIG. 1) and a second groove 324 (see FIG. 2) respectively defined in the catch member 32, and an operation knob 310 fixedly formed on a sleeve 31 which is slidably mounted around the associated handle 232 for moving the associated catch member 32 upwardly and downwardly by means of a linking wire 312.

In operation, each of the catch members 32 is initially secured to the associated positioning base 22 with the first retaining rod 221 locked in the first groove 322 such that each of the two handles 232 is secured to a corresponding one of the two positioning bases 22.

Each of the first retaining rods 221 can be released from the associated first groove 322 by means of drawing the operation knob 310 upwardly so as to move the associated catch member 32 upwardly via the linking wire 312 to detach from the associated positioning base 22 such that each of the two handles 232 is released from and pivoted relative to the associated positioning base 22 to a location as shown in FIG. 4.

Each of the catch members 32 can be secured to the associated armrest 11 with the second retaining rod 113 thereof locked in the associated second groove 324 of the catch member 32 such that each of the two handles 232 is secured to a corresponding one of the two armrests 11.

Each of the second retaining rods 113 can be released from the associated second groove 324 by means of drawing the operation knob 310 upwardly so as to move the associated catch member 32 upwardly to detach from the associated armrest 11 such that each of the two handles 232 is released from the associated armrest 11 and is pivoted relative to the associated positioning base 22.

Figure 5:
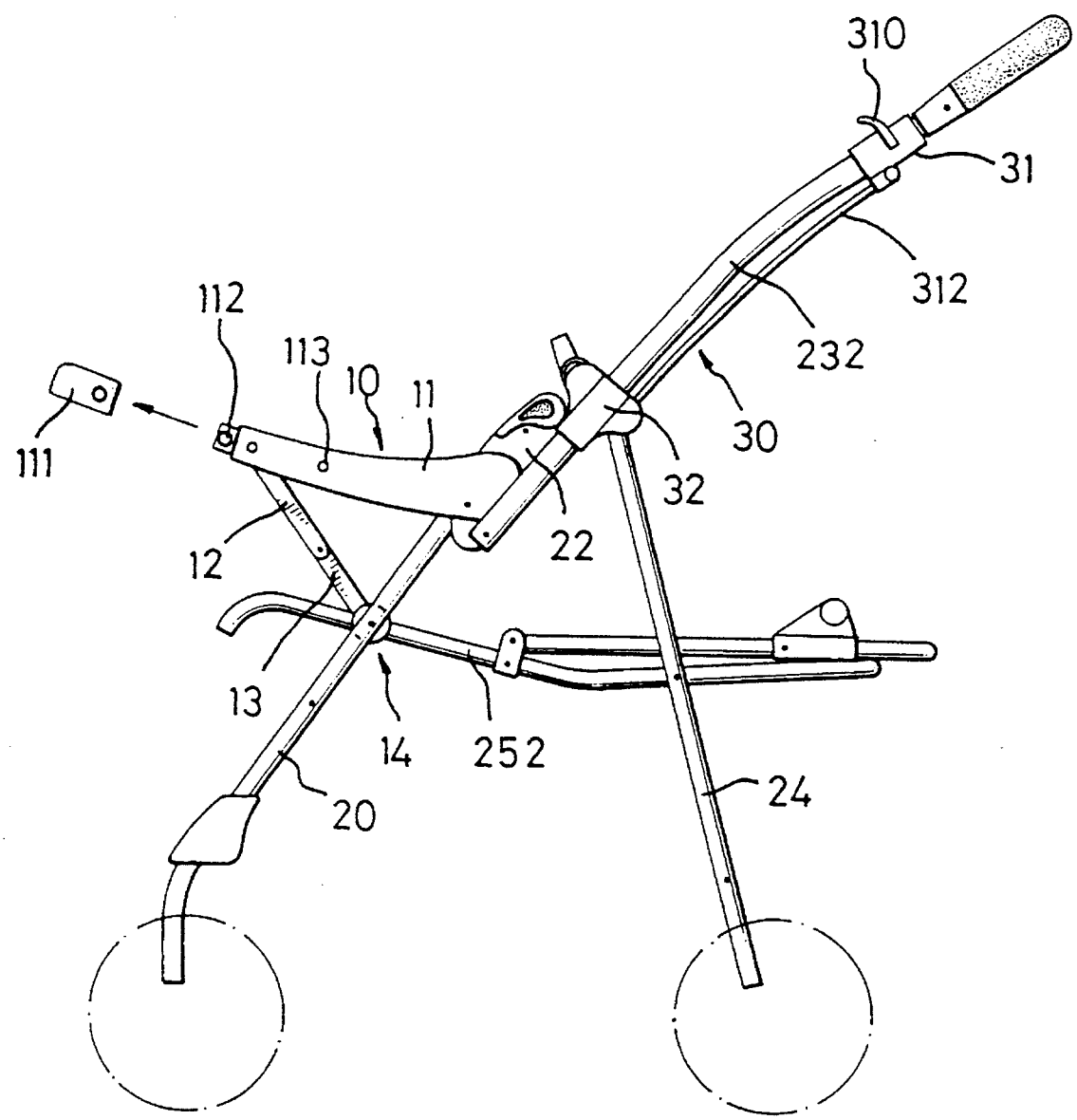
FIG. 5 is a partially exploded view of FIG. 3.

Referring to FIG. 5 with reference to FIG. 2, the armrest module 10 includes a substantially U-shaped support arm 111 having two end portions each detachably attached to a corresponding one of the two armrests 11. There are two press buttons 112 each biased between one of the two armrests 11 and the associated end portion of the support arm 111.

Figure 6:
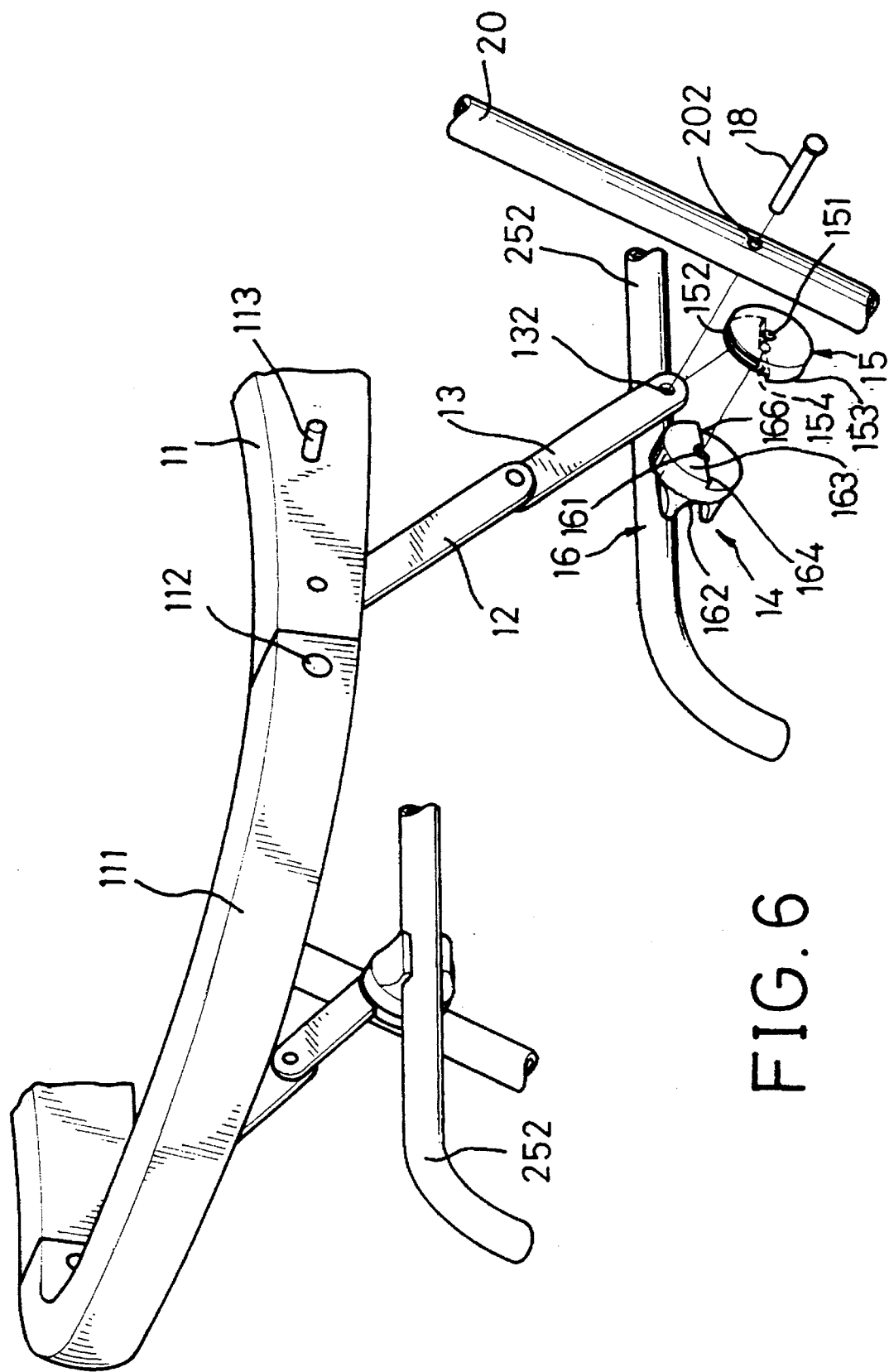
FIG. 6 is a partially exploded view showing a transmission mechanism.

Referring to FIGS. 2 and 6, there are two first linking levers 12 each having a first end pivotally engaged with a corresponding one of the two armrests 11 and a second end pivotally engaged with a first end of a corresponding one of two second linking levers 13 which each include a second end having a first hole 132 transversely defined therethrough.

A pair of transmission mechanisms 14 each include first and second ring elements 15 and 16 for operating pivot movement between the first stand 20, the second linking lever 13 and the support brace 252.

Each of the two first ring elements 15 has a second hole 151 transversely defined through a central portion thereof. Two slots 152 are each defined in a periphery of a corresponding one of the two first ring elements 15 for receiving the second end of a corresponding one of the two second linking levers 13 therein and communicating with the associated second hole 151 which is in alignment with the associated first hole 132.

Each of the two second ring elements 16 is engaged with a corresponding one of the two first ring elements 15 to rotate therewith, and has a third hole 161 transversely defined in a central portion thereof and in alignment with a corresponding one of the two first holes 132, and has a recess 162 laterally defined therein for receiving the first end of a corresponding one of the two support braces 252 therein.

Two fourth holes 202 are each transversely defined through the mediate portion of a corresponding one of the two first stands 20 and are each in alignment with a corresponding one of the two second holes 151.

Two pins 18 each extend through a corresponding one of the two fourth holes 202, the associated second hole 151, the associated first hole 132, and the associated third hole 161 by means of such as rivet engagement, thereby coupling the mediate portion of the associated first stand 20, the associated first ring element 15, the second end of the associated second linking lever 13 and the associated second ring element 16 together.

Preferably, each of the two first ring elements 15 has a sector lug 153 laterally formed thereon. Each of the two second ring elements 16 has a semi-circular lug 163 laterally formed thereon which is rested on the associated sector lug 153 such that the first and second ring elements 15 and 16 are rotated in concert with each other.

Figure 7:
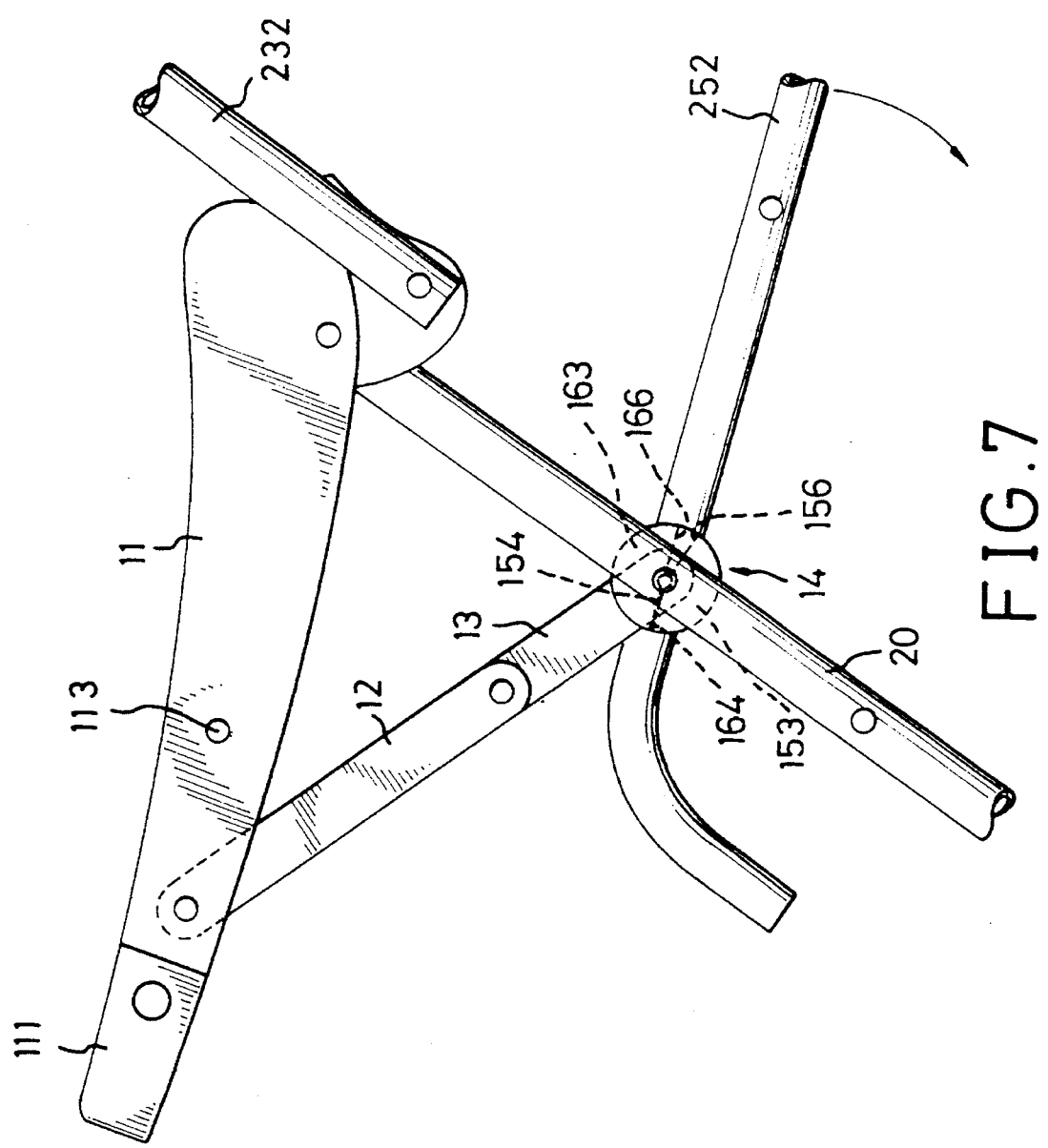
FIG. 7 is an assembly view of FIG. 6.

Referring to FIGS. 6–9, a first side 164 of the semi-circular lug 163 is rested on a first side 154 of the associated sector lug 153 whose second side 156 is separated from a second side 166 of the semi-circular lug 163 as shown in FIG. 7.

Figure 8:
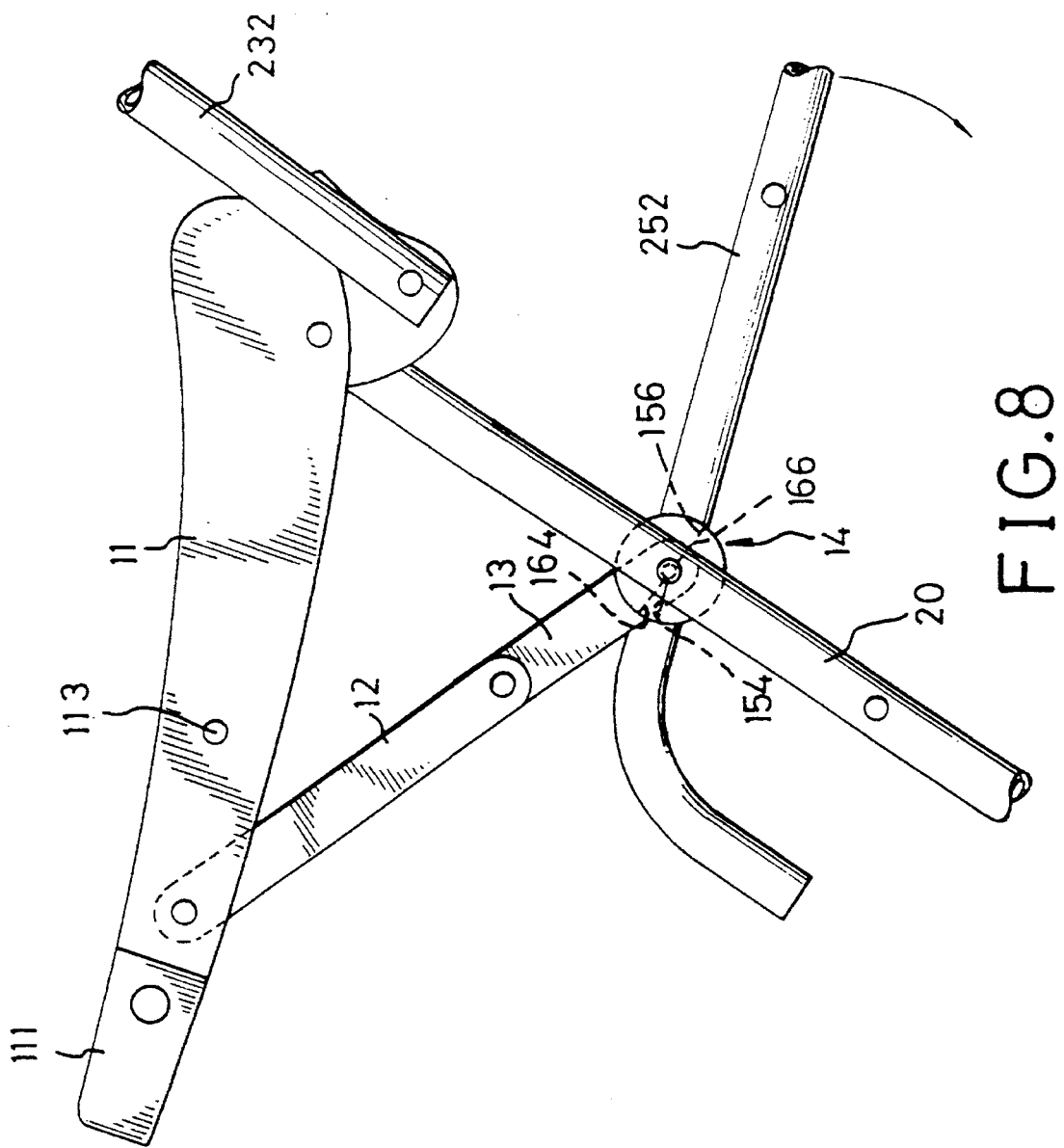
FIG. 8 is an operational view of FIG. 7.

When the support brace 252 is pivoted clockwise, the second ring element 16 is rotated clockwise therewith such that the second side 166 of the semi-circular lug 163 is urged on the second side 156 of the associated sector lug 153 whose first side 154 is separated from the first side 164 of the semi-circular lug 163 as shown in FIG. 8.

Figure 9:
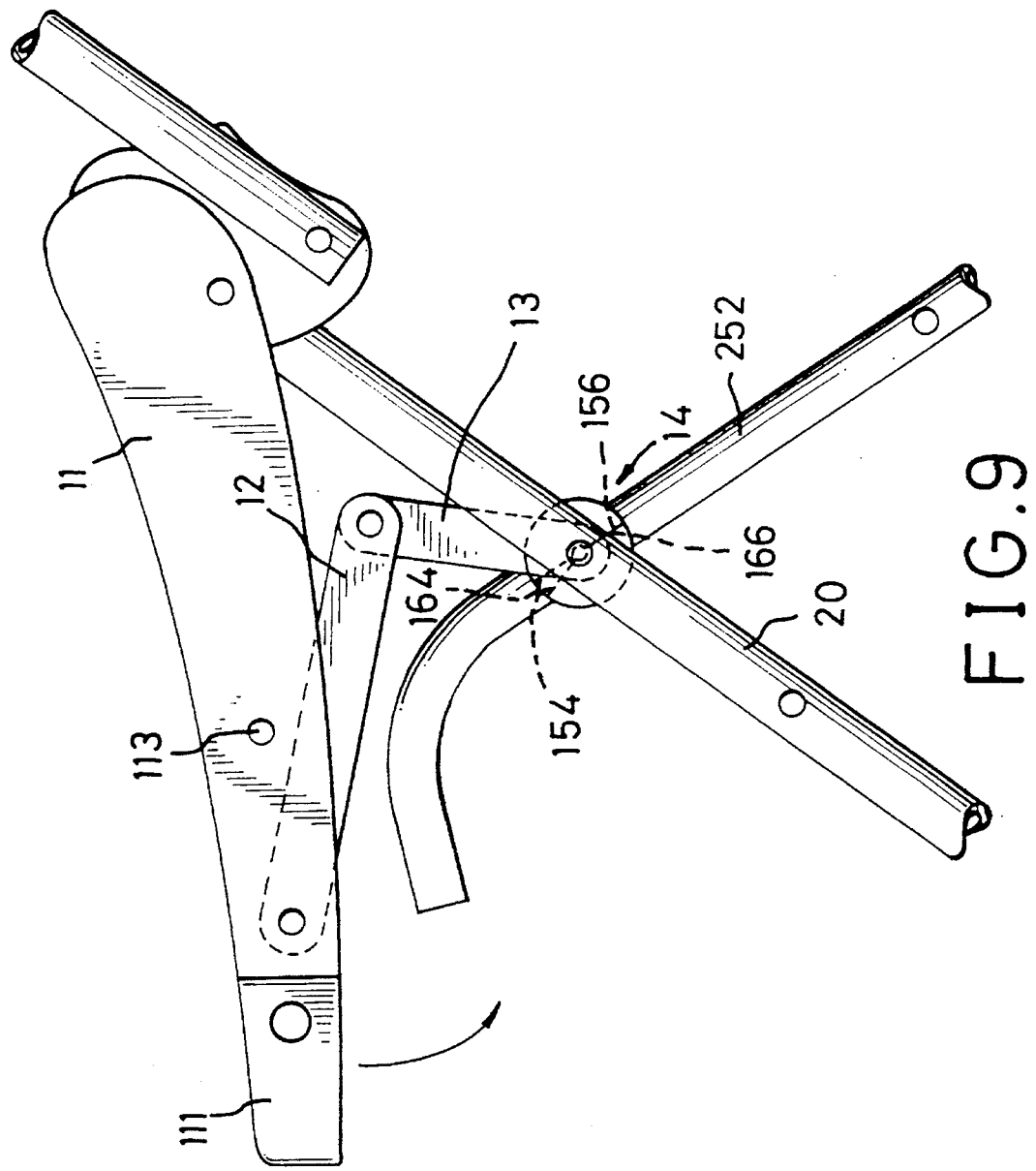
FIG. 9 is a further operational view of FIG. 8.

When the support brace 252 is further pivoted clockwise, the second ring element 16 is rotated clockwise therewith such that the second linking lever 13 is rotated by means of the first ring element 15 and such that the first linking lever 12 is pivoted therewith, thereby folding the stroller (see FIG. 9).

It should be clear to those skilled in the art that further embodiments of the present invention may be made without departing from the teachings of the present invention.

I claim:

1. An armrest and handle assembly for a stroller which comprises a pair of first stands each having a bore transversely defined in a mediate portion thereof, a pair of second stands each pivotally engaged with a corresponding one of said pair of first stands, a substantially U-shaped seat support member pivotally mounted between said first and second stands and including two support braces each having a first end pivotally engaged with the mediate portion of a corresponding one of said pair of first stands and a second end pivotally engaged with a mediate portion of a corresponding one of said pair of second stands, said armrest and handle assembly comprising:

a pair of positioning bases each fixedly mounted on an upper portion of a corresponding one of said pair of first stands, two first retaining rods each formed on a corresponding one of said pair of positioning bases;

a substantially U-shaped armrest module including two armrests each having a first end portion pivotally engaged with a corresponding one of said pair of positioning bases and each having a second end portion, two second retaining rods each formed on the second end portion of a corresponding one of said two armrests;

a substantially U-shaped handle module including two handles each having a lower end pivotally engaged with a corresponding one of said pair of positioning bases;

a pair of switch devices each mounted on a corresponding one of said two handles and each including a catch member detachably engaged with a corresponding one of said two first retaining rods, each of said two catch members being slidable on an associated said handle between a first position where said catch member is stopped by an associated said first retaining rod such that each of said two handles is secured to a corresponding one of said two positioning bases, and a second position where said catch member is detached from an associated said first retaining rod such that each of said two handles is released from and pivoted relative to an associated said positioning base, each of said catch members being detachably engaged with a corresponding one of said two second retaining rods and slidable on an associated said handle between a third position where said catch member is stopped by an associated said second retaining rod such that each of said two handles is secured to a corresponding one of said two armrests, and a fourth position where said catch member is detached from an associated said second retaining rod such that each of said two handles is released from an associated said armrest and is pivoted relative to an associated said positioning base;

two first linking levers each having a first end pivotally engaged with an associated said armrest and a second end, two second linking levers each having a first end pivotally engaged with the second end of an associated said first linking lever and a second end having a first hole transversely defined therein;

two first ring elements each having a second hole transversely defined in a central portion thereof and each having a slot defined in a periphery thereof for receiving the second end of an associated said second linking lever therein and communicating with an associated said second hole which is in alignment with an associated said first hole;

two second ring elements each secured to an associated said first ring element to rotate therewith, and each having a third hole transversely defined in a central portion thereof and in alignment with an associated said first hole, and each having a recess laterally defined therein for receiving the first end of an associated said support brace therein: and two pins each extending through an associated said bore, an associated said second hole, an associated said first hole, and an associated said third hole, thereby coupling the mediate portion of an associated said first stand, an associated said first ring element, the second end of an associated said second linking lever and an associated said second ring element together.

* * * * *